United States Patent Office  3,482,002
Patented Dec. 2, 1969

3,482,002
PHOSPHORUS ACID-CARBOXYLIC
ACID ANHYDRIDES
James L. Dever, Lewiston, and James J. Hodan, Williamsville, N.Y., assignors to Hooker Chemical Corporation, Niagara Falls, N.Y., a corporation of New York
No Drawing. Filed July 27, 1966, Ser. No. 568,138
Int. Cl. C07d 105/04; C08k 1/60; C10l 1/26
U.S. Cl. 260—935    12 Claims

ABSTRACT OF THE DISCLOSURE

Cyclic organophosphorus anhydrides, prepared by reacting a carboxylic acid salt with a cyclic phosphorohalidite, e.g., 2-acetoxy-1,3,2-dioxaphospholane, are useful as chemical intermediates, stabilizers, plasticizers, gasoline or oil additives, or flame retardant agents.

---

This invention relates to novel phophorus anhydrides. More particularly, the invention relates to novel cyclic organophosphorus anhydrides prepared by reacting a carboxylic acid salt with a cyclic phosphorohalidite.

The novel compounds of this invention may be characterized by the formulas:

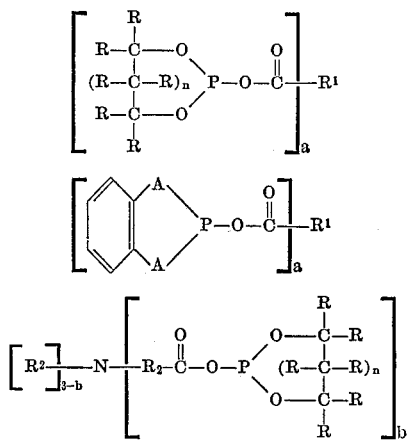

and

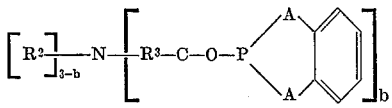

wherein R is independently selected from the group consisting of hydrogen and alkyl radicals of 1 to 8 carbon atoms, preferably from 1 to 4 carbon atoms, $R^1$ is selected from the group consisting of hydrogen, alkyl and alkylene radicals of 1 to 18 carbon atoms, preferably from 1 to 12 carbon atoms, alkenyl and alkenylene radicals of 2 to 18 carbon atoms, preferably of 2 to 12 carbon atoms, aryl and arylene radicals of 6 to 18 carbon atoms, preferably from 6 to 12 carbon atoms, aralkyl and aralkylene of 7 to 18 carbon atoms, preferably from 7 to 12 carbon atoms, $R^2$ is selected from the group consisting of alkyl radicals of 1 to 12 carbon atoms, preferably of 1 to 6 carbon atoms, and aryl radicals of 6 to 18 carbon atoms, preferably of 6 to 12 carbon atoms, $R^3$ is selected from the group consisting af alkylene of 1 to 4 carbon atoms, A is a chalcogen independently selected from the group consisting of oxygen and sulfur, $a$ is 1 to 2, $b$ is 1 to 3, and $n$ is 0 to 1. When $a$ is 1, $R^1$ is hydrogen, alkyl, alkenyl, aryl or aralkyl, and when $a$ is 2, $R^1$ is alkylene, alkenylene, arylene or aralkylene.

Typical non-limiting examples of the novel prosphorus anhydrides of this invention are:

2-formyloxy-1,3,2-dioxaphospholane
2-acetoxy-1,3,2-dioxaphospholane
2-propionyloxy-1,3,2-dioxaphospholane
2-phenyloxy-1,3,2-dioxaphospholane
2-formyloxy-4-methyl-1,3,2-dioxaphospholane
2-acetoxy-4,5-dimethyl-1,3,2-dioxaphospholane
2-propionyloxy-4-ethyl-1,3,2-dioxaphospholane
2-butyryloxy-4,4-dimethyl-1,3,2-dioxaphospholane
2-acetoxy-5-butyl-5-ethyl-1,3,2-dioxaphospholane
2-formyloxy-1,3,2-dioxaphosphorinane
2-acetoxy-1,3,2-dioxaphosphorinane
2-propionyloxy-1,3,2-dioxaphosphorinane
2-butyryloxy-1,3,2-dioxaphosphorinane
2-formyloxy-5,5-dimethyl-1,3,2-dioxaphosphorinane
2-acetoxy-5,5-dimethyl-1,3,2-dioxaphosphorinane
2-propionyloxy-1,3,2-dioxaphosphorinane
4,5-benzo-2-acetoxy-1,3,2-dioxaphospholane
4,5-benzo-2-acetoxy-1-thia-3-oxa-2-phospholane
4,5-benzo-2-formyloxy-1,3,2-dioxaphospholane
4,5-benzo-2-formyloxy-1-thia-3-oxa-2-phospholane
4,5-benzo-2-propionyloxy-1,3,2-dioxaphospholane
4,5-benzo-2-butyryloxy-1-thia-3-oxa-2-phospholane,
and the like.

The products obtained when dicarboxylic acid salts, as hereinafter described, are employed in the reaction, are the corresponding bis(1,3,2-dioxaphospholanes), bis(1,3,-2-dioxaphosphorinanes), bis(4,5-benzo-1,3,2-dioxaphospholanes) or bis(4,5-benzo-1-thia-3-oxa-2-phospholanes), are exemplified by

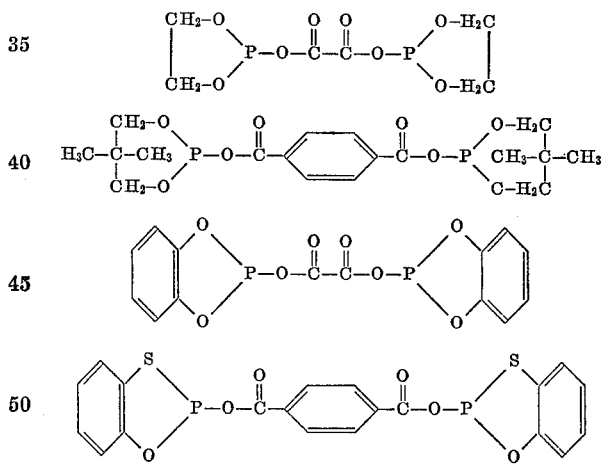

and the like.

The products obtained when compounds of the formula

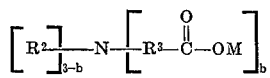

as hereinafter described, are employed in the reaction are exemplified by

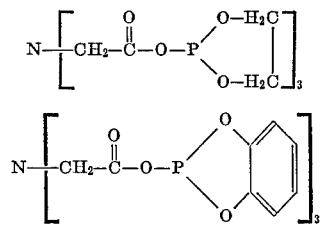

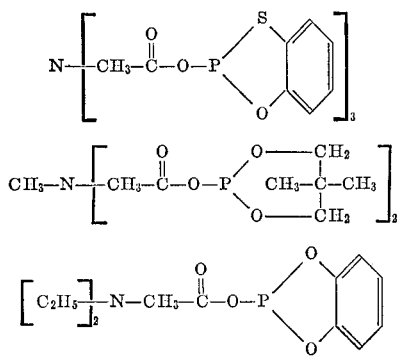

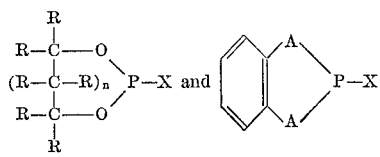

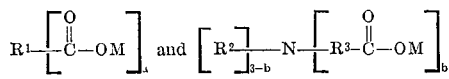

and the like.

The novel anhydrides of the invention are prepared by a process which comprises reacting under substantially anhydrous conditions a cyclic phosphorohalidite selected from the group consisting of compounds characterized by the formulas:

$$R-\underset{R}{\overset{R}{C}}-O\diagdown \atop (R-\underset{R}{\overset{R}{C}}-R)_n \; P-X \quad \text{and} \quad \begin{array}{c}A\\A\end{array} P-X$$

wherein R, A and $n$ are as previously described, and X is halogen, preferably chlorine or bromine, with a carboxylic acid salt characterized by either of the formulas:

$$\left[ R^1-\underset{\parallel}{\overset{O}{C}}-OM \right]_a \quad \text{and} \quad \left[ R^2 \right]_{3-b} N \left[ R^3-\underset{\parallel}{\overset{O}{C}}-OM \right]_b$$

wherein $R^1$, $R^2$, $R^3$, $a$ and $b$ are as previously described, and M is selected from the group consisting of ammonium, alkali metal and alkaline earth metal. Non-limiting examples of the phosphorohalidites utilized in the process of this invention are ethylene phosphorochloridite, ethylene phosphorobromidite, 2-chloro-4-methyl-1,3,2-dioxaphospholane, 2-chloro-4,5-dimethyl - 1,3,2 - dioxaphospholane, 2-bromo-4-ethyl-1,3,2-dioxaphospholane, 2-bromo-4,4-dimethyl-1,3,2-dioxaphospholane, 2-chloro-4,4,5,5-tetramethyl - 1,3,2 - dioxaphospholane, 2 - chloro-5,5,4-triethyl-1,3,2-dioxaphospholane, 2-chloro-4,4,5-triethyl-1,3,2-dioxaphospholane, 2-chloro-1,3,2-dioxaphosphorinane, 2-chloro-5,5-dimethyl-1,3,2-dioxaphosphorinane, 2 - bromo-5,5 - dimethyl-1,3,2-dioxaphosphorinane, 2-chloro - 5,5-diethyl-dioxaphosphorinane, 2-bromo-4,5,6-trimethyl-1,3,2-dioxaphosphorinane, 2-chloro-5,5-dibutyl-1,3,2-dioxaphosphorinane, 2 - chloro-4,4,6-trimethyl-1,3,2-dioxaphosphorinane, 4,5 - benzo-2-chloro-1,3,2 - dioxaphospholane, 4,5-benzo-2-chloro-1-thia-3-oxa-2-phospholane, 4,5 - benzo-2-bromo-1,3,2-dioxaphospholane, 4,5-benzo-2-bromo-1-thia-3-oxa-2-phospholane, and the like.

Non-limiting examples of the carboxylic acid salts which may be employed in the practice of this invention are ammonium acetate, sodium acetate, potassium acetate, lithium acetate, calcium acetate, barium acetate, magnesium acetate, strontium acetate, ammonium propionate, sodium propionate, potassium propionate, ammonium butyrate, sodium butyrate, calcium butyrate, potassium valerate, calcium valerate, strontium valerate, sodium caproate, calcium caprylate, ammonium undecanoate, sodium laurate, ammonium laurate, potassium laurate, calcium laurate, sodium myristate, calcium myristate, sodium benzoate, ammonium benzoate, potassium benzoate, sodium phenylacetate, potassium phenylacetate, ammonium phenylpropionate, sodium phenylpropionate, potassium phenylbutyrate, calcium phenylbutyrate, sodium phenylvalerate, sodium acrylate, potassium acrylate, sodium oxalate, potassium oxalate, calcium malonate, potassium succinate, sodium succinate, sodium fumarate, calcium fumarate, ammonium phthalate, sodium phthalate, magnesium phthalate, potassium isophthalate, sodium terephthalate, trisodium nitrolotriacetate, trisodium nitrilotripropionate, tripotassium nitrilotributyrate, disodium phenyliminodiacetate, sodium N,N-diphenylglycinate, dipotassium ethyliminodiacetate, diammonium phenyliminodiacetate, and the like.

The reaction mixture of carboxylic acid salt and cyclic phosphorohalidite may be prepared in any suitable manner, as, for example, by means adapted for batch operation or the like.

Generally, the temperature at which the reaction is carried out may be in the range of from about zero degrees centigrade to about 75 degrees centigrade. Preferably, temperatures within the ranges of from about 10 degrees centigrade to about 45 degrees centigrade are employed. Since the reaction is exothermic, the heat of reaction is removed, as, for example, by external cooling.

The reactants are usually employed in stoichiometric proportions. Thus, one molar proportion of carboxylic acid salt is reacted with up to three molar proportions of phosphorohalidite. However, molar proportions of salt to phosphorohalidite of 0.5:1 to 5:1 may be employed. Inert organic solvents or diluents, such as toluene, dioxane, benzene, tetrahydrofuran and the like, may conveniently be employed in the reaction. The reaction may also be carried out without the aid of a solvent. As previously indicated, the process is preferably conducted under anhydrous conditions. Thus, the reactants and solvents employed are substantially anhydrous.

In the practice of the invention, atmospheric pressure is usually employed. However, it is also within the scope of this invention to utilize subatmospheric or superatmospheric pressures. The reaction time is dependent upon a variety of factors, such as the concentration and nature of the reactants, temperature, pressure, if employed, type of equipment employed and the like. Generally, completion of the reaction is effected in about one to twelve hours.

The reaction mixture can be worked up in any conventional manner. If a product of high purity is desired, the solid constituents may be separated from the reaction mixture by filtration, decantation or the like, and the resulting filtrate stripped of solvent and reactants. If further separation or purification is desired, techniques such as distillation, extraction, crystallization or the like may be conveniently employed.

When it is desired to utilize the cyclic phosphorus anhydrides of this invention as chemical intermediates of great versatility, separation of the anhydride is not always required because of the high yields of relatively pure product obtained by the process of the invention. Thus, usually the reaction products are utilized in situ to form compounds, such as cyclic phosphorus esters.

The organophosphorus anhydrides prepared in accordance with this invention find utility as chemical intermediates, stabilizers, plasticizers, gasoline or lubricatng oil additives, flame retarding agents, and the like.

The following examples illustrate the process of the invention. All temperatures are in degrees centigrade and all parts are by weight unless otherwise indicated.

Example 1

A reaction flask was charged with 39 parts of dry ammonium acetate and 155 parts of tetrahydrofuran. To this initial charge were added 63 parts of ethylene phosphorochloridite dropwise over a half-hour period, while the temperature of the reaction vessel was maintained below 35 degrees centrigrade, utilizing some external cooling. The reaction mixture was stirred over a two-hour period and filtered. The filtrate was stripped of solvent and the residue distilled to give 48 parts (64 percent conversion) of product. Redistillation of the residue yielded pure 2-acetoxy-1,3,2-dioxophospholane having a boiling point of 55 degrees centigrade at 0.5 millimeter of mercury absolute pressure. The structure of the compound is represented by the following formula:

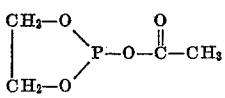

The product was analyzed and was found to contain 32.1 percent carbon; 4.8 percent hydrogen; and 20.5 percent phosphorus. The calculated percentages for these elements in a compound having the empirical formula: $C_4H_7O_4P$ are 32.0 percent carbon; 4.7 percent hydrogen; and 20.7 percent phosphorus. Infrared and Nuclear Magnetic Resonance analysis verified the indicated structure.

Example 2

A reaction flask was charged initially with 82 parts of sodium acetate and 155 parts of tetrahydrofuran. Thereafter, 127 parts of ethylene phosphorochloridite were added dropwise over a half-hour period, while the reaction mixture was maintained at a temperature in the range of 25 to 35 degrees centigrade. After stirring and standing overnight, the mixture was filtered. The solvent present in the filtrate was removed at reduced pressure. Distillation of the residue yielded 107 parts (71 percent conversion) of 2-acetoxy-1,3,2-dioxophospholane having a boiling point of 58–62 degrees centigrade at 0.8 millimeter of mercury absolute pressure.

Example 3

A reaction flask was charged with 96 parts of sodium benzoate and 155 parts of tetrahydrofuran. To this were added dropwise 84 parts of ethylene phosphorochloridite over a twenty-minute period, while the reaction temperature was maintained at 25–35 degrees centigrade. Thereafter, the reaction mixture was stirred for one hour and filtered. The resulting precipitate was washed with 178 parts of tetrahydrofuran. The filtrates were combined and the solvent removed at reduced pressure. The residue remaining after stripping was 130 parts of product (92 percent conversion). The residue completely solidified to a waxy, white solid. The structural formula for this compound is as follows:

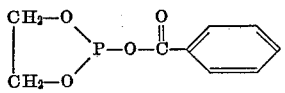

Example 4

A reaction flask was charged with 68 parts of dry sodium formate and 133 parts of tetrahydrofuran. To this initial charge were added 127 parts of ethylene phosphorochloridite dropwise over a 55-minute period with no indication of reaction. The mixture was stirred for one and one-half hours and a maximum temperature of 45 degrees was reached. The mixture was stirred for an additional hour and a quarter and the resulting mixture was then filtered. After removal of the solvent, distillation of the residue resulted in the isolation of 107 parts (83 percent conversion) of clear, colorless 2-formyloxy-1,3,2-dioxophospholane having a boiling point of 54–57 degrees centigrade at 0.5–0.8 millimeter of mercury absolute pressure. The structure of this compound is represented by the following formula:

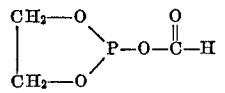

Example 5

A reaction vessel was charged with 90 parts of dry sodium acetate and 200 parts of dioxane. To this initial charge were added 168 parts of neopentyl phosphorochloridite in one portion. The reaction mixture was stirred and the temperature rapidly rose to 70 degrees centigrade. The reaction was cooled to maintain it at that temperature. After stirring the reaction mixture for an additional hour, it was filtered. The filtrate was stripped initially at 60 degrees centigrade and 20 millimeters of mercury absolute pressure and, thereafter, the temperature was raised to 85 degrees centigrade at 0.5 millimeter of mercury absolute pressure. This procedure resulted in the formation of 185 parts of residue (97 percent conversion). The residue was a white solid, 5,5-dimethyl-2-acetoxy-1,3,2-dioxophosphorinane, having the formula:

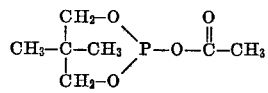

Example 6

A reaction vessel was charged with 49 parts of sodium acetate and 311 parts of tetrahydrofuran. To this mixture were added 87 parts of 4,5-benzo-2-chloro-1,3,2-dioxophospholane dropwise over a half-hour period. The temperature was kept below 35 degrees centigrade. The reaction mixture was stripped and the product was isolated. The compound had the structural formula:

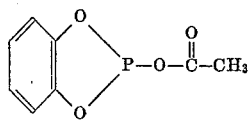

Example 7

A reaction vessel was initially charged with 27 parts of sodium acetate and 89 parts of tetrahydrofuran. To this initial charge were added dropwise 48 parts of 4,5-benzo-2-chloro-1-thia-3-oxa-2-phospholane over a 15-minute period, while the temperature was maintained below 40 degrees centigrade. The reaction mixture was stripped and resulted in the formation of a product having formula:

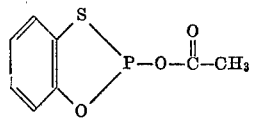

Example 8

A reaction vessel was charged with 64 parts of dry trisodium nitrilotriacetate and 250 parts of dioxane. Thereafter, 95 parts of ethylene-phosphorochloridite were added dropwise to the mixture over a 0.45 hour period, while the temperature was maintained at about 30–38 degrees centigrade by means of occasional cooling. The mixture was stirred for an additional 0.5 hour and filtered. Solvent was removed from the filtrate at 50 degrees centigrade and 15 millimeters of mercury absolute pressure, and 117 parts of clear, yellow viscous product recovered. The product was

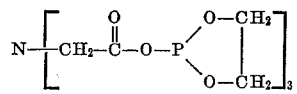

Example 9

The utility of novel phosphorus anhydrides is illustrated by the following example.

A reaction flask was charged with 75 parts of 2-acetoxy-1,3,2-dioxaphospholane. To this was added 37 parts of n-butanol dropwise over a period of 0.4 hour, at a temperature of 5–15 degrees centigrade, cooling as required. The resulting mixture was stirred for 15 minutes at ambient temperatures and gradually concentrated to 50 degrees centigrade at 2.75 millimeters of absolute pressure. Distillation yielded 56 parts (68 percent conversion) of 2-butoxy-1,3,2-dioxaphospholane, having a boiling point of 65–74 degrees centigrade at 3.2–3.8 millimeters of mercury absolute pressure. The index of refraction was $n_D^{25}$ 1.4440–1.4446. Redistillation of the product yielded a compound having a boiling point of 57.5–58 degrees centigrade at 2.7 millimeters of mercury absolute pressure. The product was found to contain 44.1 percent carbon, 8.1 percent hydrogen and 18.8 percent phosphorus. The calculated percentages for these elements in $C_6H_{13}O_3P$ are: 43.9 percent carbon; 7.98 percent hydrogen and 18.9 percent phosphorus.

What is claimed is:

1. A compound selected from the group consisting of

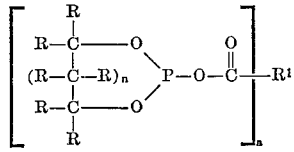

and

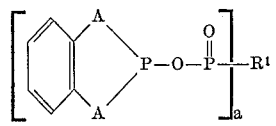

wherein $a$ is from 1 to 2, $n$ is from 0 to 1, R is independently selected from the group consisting of hydrogen and alkyl, when $a$ is 1, $R^1$ is selected from the group consisting of alkyl, alkenyl, aryl and aralkyl, when $a$ is 2, $R^1$ is selected from the group consisting of alkylene, alkenylene, arylene and aralkylene, and A is a chalcogen selected from the group consisting of oxygen and sulfur.

2. A compound according to claim 1 wherein R is independently selected from the group consisting of hydrogen or alkyl radicals of 1 to 8 carbon atoms, $R^1$ is selected from the group consisting of hydrogen, alkyl and alkylene radicals of 1 to 18 carbon atoms, alkenyl and alkenylene radicals of 2 to 18 carbon atoms, aryl and arylene radicals of 6 to 18 carbon atoms, and aralkyl and aralkylene radicals of 7 to 18 carbon atoms, and A is oxygen.

3. A compound according to claim 2 of the formula:

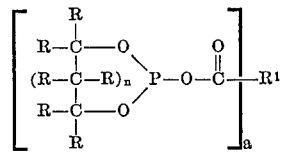

4. A compound according to claim 3 wherein $R^1$ is alkyl or alkylene.

5. A compound according to claim 2 of the formula:

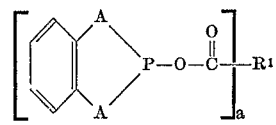

6. A compound according to claim 5 wherein $R^1$ is alkyl or alkylene.

7. A compound according to claim 1 of the formula:

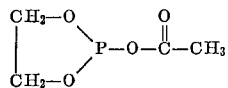

8. The compound according to claim 1 of the formula:

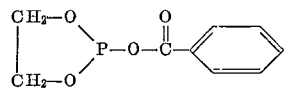

9. The compound according to claim 1 of the formula:

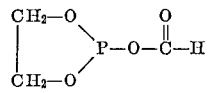

10. The compound according to Claim 1 of the formula:

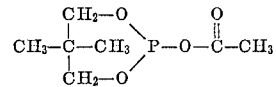

11. The compound according to claim 1 of the formula:

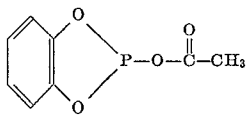

12. The compound according to claim 1 of the formula:

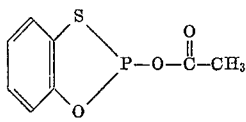

References Cited

UNITED STATES PATENTS 2,659,747  11/1953  Young _____ 260—935
3,201,437  8/1965  Friedman _____ 260—927

CHARLES B. PARKER, Primary Examiner

R. L. RAYMOND, Assistant Examiner

U.S. Cl. X.R.

252—8.1, 46.6, 46.7, 48.8, 48.9, 400; 260—988

PO-1050
(5/69)

UNITED STATES PATENT OFFICE
CERTIFICATE OF CORRECTION

Patent No. 3,482,002              Dated   December 2, 1969

Inventor(s)       James L. Dever et al.

It is certified that error appears in the above-identified patent and that said Letters Patent are hereby corrected as shown below:

Column 1, line 20, "phophorus" should read -- phosphorus --; column 1, line 41, that portion of the formula reading "$R_2-C$" should read -- $R^3-C$ --; column 1, line 67, "af" should read -- of --; column 2, line 1, "prosphorus" should read -- phosphorus --; column 2, line 31, ", are" should read -- , and are --; column 2, line 41, that portion of the formula reading column 4, line 54, "lubricatng" should read -- lubricating --; column 7, line 19, Claim 1, the formula should be corrected to read

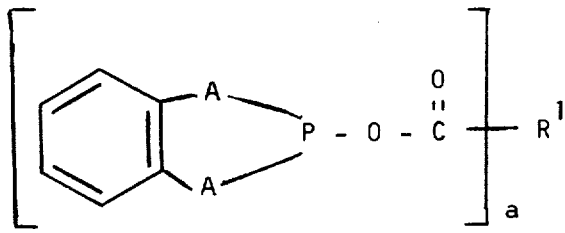

SIGNED AND
SEALED
JAN 19 1971

(SEAL)
Attest:

Edward M. Fletcher, Jr.
Attesting Officer

WILLIAM E. SCHUYLER, JR.
Commissioner of Patents